United States Patent [19]

Struger et al.

[11] 4,158,226
[45] Jun. 12, 1979

[54] PROGRAMMABLE CONTROLLER WITH LIMIT DETECTION

[75] Inventors: Odo J. Struger, Chagrin Falls; Valdis Grants, Lyndhurst, both of Ohio

[73] Assignee: Allen-Bradley Company, Milwaukee, Wis.

[21] Appl. No.: 853,721

[22] Filed: Nov. 21, 1977

[51] Int. Cl.² .................. G05B 11/32; G06F 9/06; G06F 15/46
[52] U.S. Cl. ............................ 364/104; 364/119; 364/900
[58] Field of Search ............... 364/104, 107, 110, 119, 364/200 MS File, 900 MS File; 235/304, 304.1, 304.2

[56] References Cited

U.S. PATENT DOCUMENTS

| 3,829,842 | 8/1974 | Langdon et al. | 364/104 X |
| 3,978,454 | 8/1976 | Willard | 364/900 |
| 3,996,565 | 12/1976 | Nakao et al. | 364/900 |
| 3,997,879 | 12/1976 | Markley et al. | 364/900 |
| 4,063,611 | 12/1977 | Jeremiah et al. | 364/900 |

Primary Examiner—Joseph F. Ruggiero
Attorney, Agent, or Firm—Quarles & Brady

[57] ABSTRACT

A programmable controller for sensing the status of sensing devices and controlling the state of operating devices in accordance with a stored program includes a position encoder input module which receives position data. In response to instructions in the stored program, the position data from the input module is compared with an upper and a lower limit stored in the controller memory, and if the data lies outside the limits, the controller logic unit is forced to a false decision.

10 Claims, 6 Drawing Figures

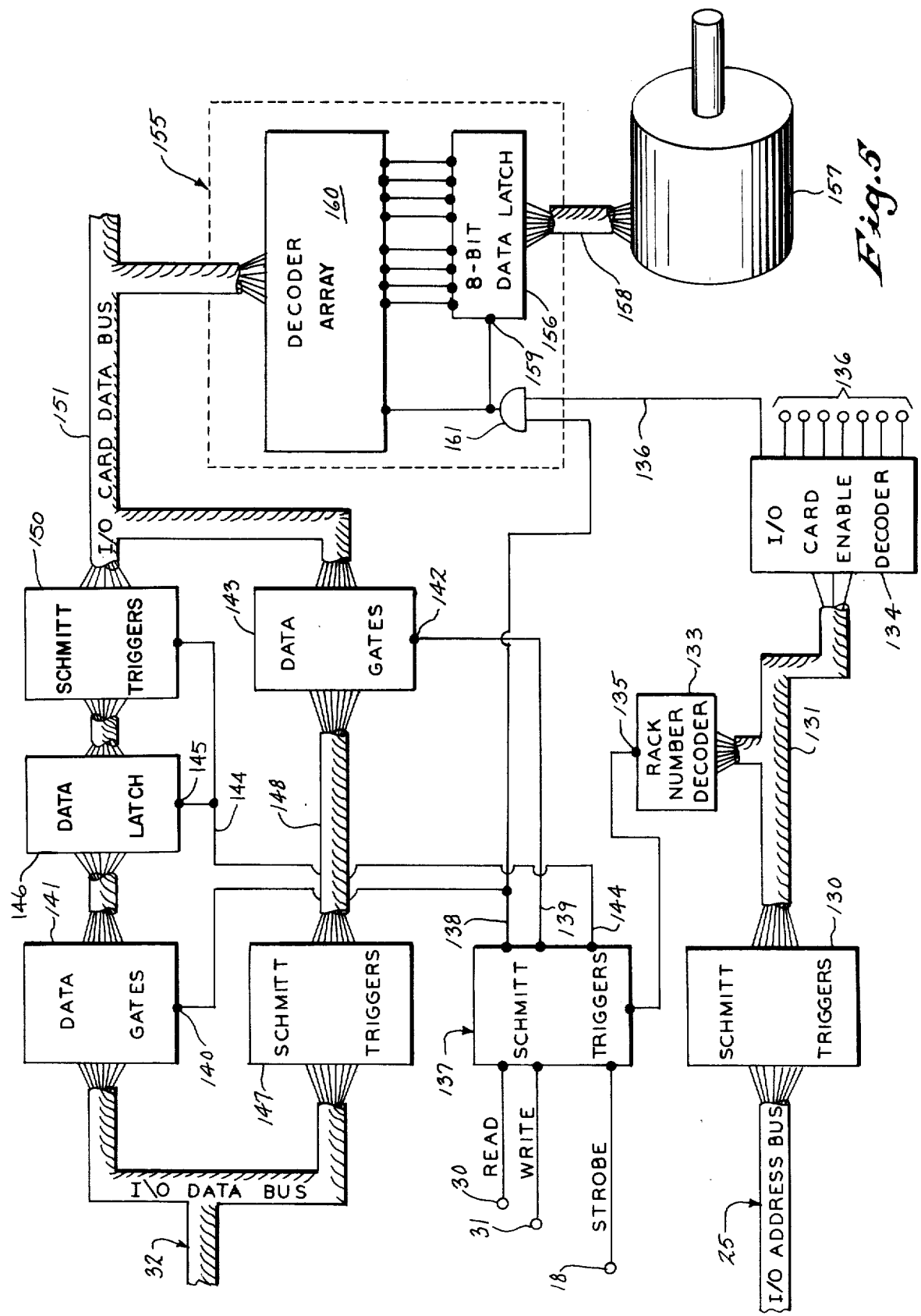

PROGRAMMABLE CONTROLLER WITH LIMIT DETECTION

BACKGROUND OF THE INVENTION

The field of the invention is programmable controllers such as those disclosed in U.S. Pat. Nos. 3,942,158 and 3,810,118 and copending patent application Ser. No. 790,251 abandoned.

Programmable controllers are typically connected to industrial equipment such as assembly lines and machine tools to sequentially operate the equipment in accordance with a stored control program. In programmable controllers such as those disclosed in the above cited patents and patent application, for example, the control program is stored in a memory and includes instructions which are read out in rapid sequence to examine the condition of selected sensing devices on the controlled equipment and instructions which energize or deenergize selected operating devices on the controlled equipment contingent upon the status of one or more of the examined sensing devices.

The processor in a programmable controller is designed to rapidly execute programmable controller type instructions which call for the manipulation of single-bit input data and the control of single-bit output data. Indeed, programmable controllers are distinguishable in this respect from process controllers which employ general purpose digital computers to control industrial equipment and processes. Whereas the primary function of a process controller may be to monitor a number of analog signals and control a number of analog operating devices, the primary function of programmable controllers is to monitor large numbers of single-bit digital devices, such as limit switches, and control a large number of single-bit operating devices such as solenoids and motor starters. As a result, the processor, or central logic unit of a programmable controller is typically less complex, less powerful and less costly than the processor of a general purpose computer, both because it processes single bits rather than words and because it is not called upon to perform substantial arithmetic functions. On the other hand, due to the large number of discrete sensing and operating devices connected to a programmable controller and the severe environment in which they are typically located, the I/O interface circuitry which couples industrial equipment to a programmable controller processor may be elaborate.

As programmable controllers grow in size and capability, they are finding increased application in industrial systems and processes which include analog devices and positioning devices which have heretofore been controlled by process controllers or special purpose hardwired control devices.

One such hardwired control device is the "programmable limit switch." Programmable limit switches are special apparatus which employ position transducers such as digital encoders or resolvers and which allow the presetting of certain angles at which a limit switch should be energized and the presetting of specific angles at which the limit switch should be denergized. They allow for multiple limit switches to be oriented along an axis and their trip position may be changed readily simply by programming or dialing in a different preset number. Such programmable limit switches are employed in place of cam operated limit switch assemblies. Although they are programmable, they are expensive devices which perform a very specific function. They do not perform other control functions on the machine and hence they must be used in combination with hard-wired logic controllers or relay panels. The resulting control is expensive.

SUMMARY OF THE INVENTION

The present invention relates to a programmable controller which provides the functions of a programmable limit switch in addition to its other well-known control functions. More specifically, the invention resides in an input module for a programmable controller which interfaces it with a position transducer and means associated with the programmable controller processor for comparing the magnitude of a digital number generated by the input module with the value of lower limit and upper limit numbers stored in a controller memory. If the number generated by the input module lies between the lower and upper limits, a true condition is indicated and stored.

The comparing means associatted with the controller processor is operated in response to the execution of a special controller instruction which is stored in the controller memory as part of the control program. When used in combination with other controller instructions, the stored result of the comparing means forms one element of a Boolean equation that determines whether or not an operating device connected to the programmable controller should be energized.

A general object of the invention is to provide a programmable controller which will also function as a programmable limit switch. In addition to inputting data from the position transducer and comparing it with upper and lower numbers, the controller may be connected to numerous sensing devices and be programmed to carry out normal programmable controller functions for numerous operating devices.

Another object of the invention is to enable programable controllers to be used to control machines which have heretofore required programmable limit switches or cam operated limit switches.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention and reference is made to the claims herein for interpreting the breadth of the invention.

BRIEF DESCRIPTION OF THE DRAWINGS

FIG. 5 is a schematic diagram of a rack adaptor circuit and the encoder input module which forms part of the present invention.

DESCRIPTION OF THE PREFERRED EMBODIMENT

Figure 1:
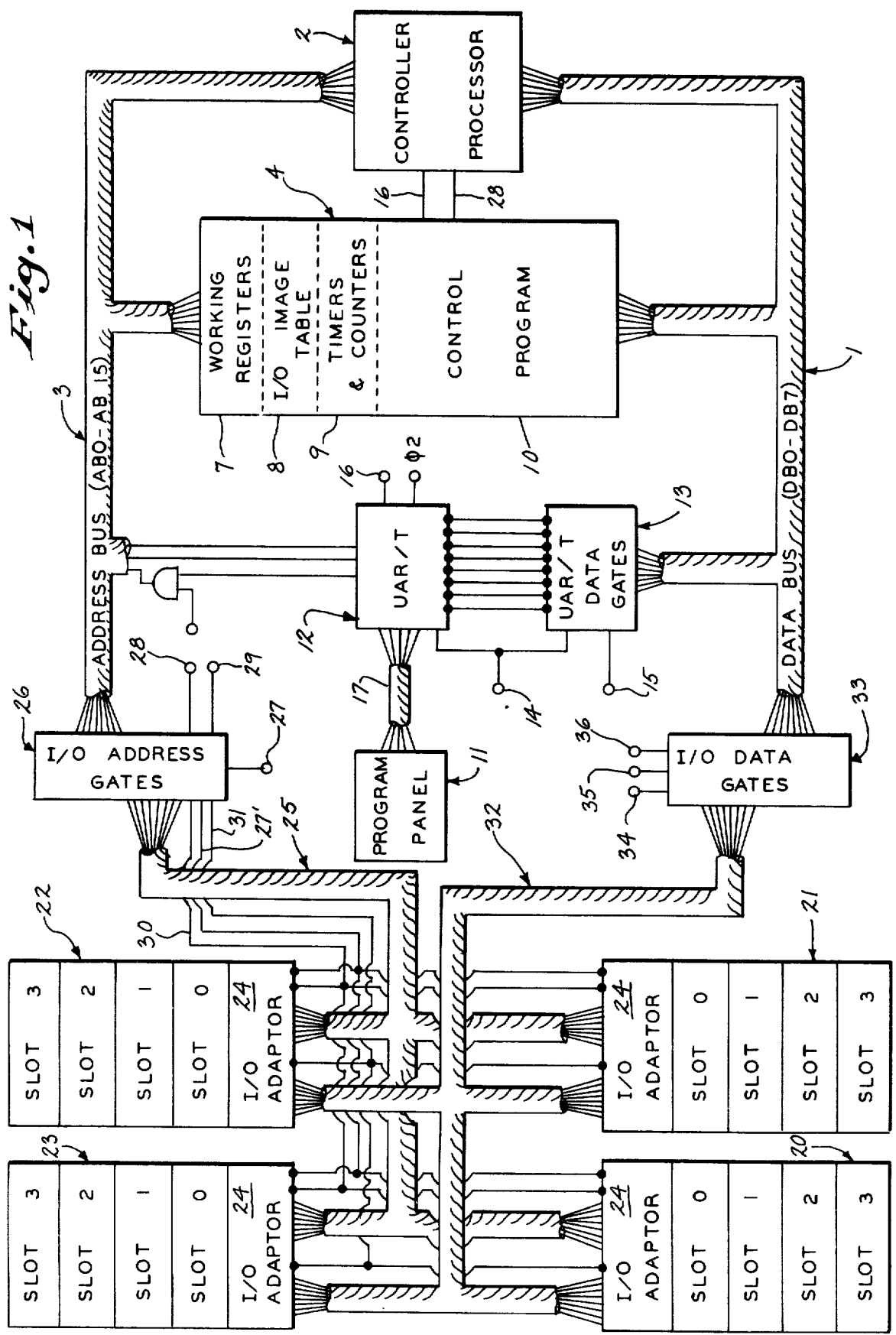
FIG. 1 is an electrical block diagram of a programmable controller which employs the present invention.

Referring to FIG. 1, the programmable controller is structured around an eight-bit bidirectional data bus 1 and includes a controller processor 2 which directs the flow of data thereon by means of control lines and a sixteen-bit address bus 3. A random access memory (RAM) 4 connects to both the data bus 1 and the address bus 3 and an eight-bit data word may be written into an addressed line or read out of an addressed line of the memory 4 in response to control signals applied to "data out strobe" and "MEMR" control lines 16 and 28. The RAM 4 may include anywhere from 2K to 8K lines of memory depending on the size of the control program to be stored. The first 256 lines consist of working registers 7, an I/O image table 8 and a timers and counters storage 9. The remainder of the RAM 4 stores the control program 10 which is comprised of a large number of programmable controller type instructions.

The control program 10 is loaded into the memory 4 and edited by means of a program panel 11 which couples to the data bus 1 through a universal asynchronous receiver/transmitter (UAR/T) 12 and a set of bidirectional data gates 13. Data is received from the program panel 11 serially through a cable 17 and the received eight-bit word is gated onto the data bus 1 when the UAR/T 12 is addressed through the address bus 3 and a logic high is applied to the UAR/T 12 and data gates 13 through an "enable SD" control line 14. Data is gated from the data bus 1 to the UAR/T 12 when a logic high voltage is applied to the UAR/T data gates 13 through an "out" control line 15 and this data is latched in the UAR/T 12 and serially transmitted to the program panel 11 when the UAR/T 12 is addressed and a logic high voltage is applied to the UAR/T 12 through the "data out strobe" control line 16.

The programmable controller is connected to the machine, or system being controlled, through I/O interface racks 20-23. Each interface rack 20-23 includes an I/O adapter card 24 and up to eight eight-bit input or output cards that are received in four slots 0-3. That is, each slot 0-3 may include two eight-bit I/O modules, or cards—a low and a high. Each input card may contain eight input circuits for receiving digital signals that indicate the status of single-bit sensing devices such as limit switches on the machine being controlled, and each output card contains eight output circuits for controlling operating devices on the machine such as motor starters and solenoids. Input and output circuits illustrated in respective U.S. Pat. Nos. 3,643,115 and 3,745,546 may be employed for this purpose although numerous circuits are available to interface with the many types of sensing devices and operating devices which may be encountered in industrial application.

Data is coupled to or from a particular card in one of the I/O interface racks 20-23 by addressing it through a five-bit I/O address bus 25. Two bits select the appropriate I/O interface rack 20-23 and the remaining three bits identify the card being addressed. As will be described in more detail hereinafter, the I/O adapter card 24 on each I/O interface rack 20-23 includes means for recognizing when its rack is being addressed and it includes means for enabling the appropriate slot and card. Reference is made to copending patent application Ser. No. 790,590 which was filed on Apr. 25, 1977 and is entitled "Monitor System for a Programmable Controller," abandoned for a more detailed description of the I/O adapter cards 24.

As will be explained in detail hereinafter, the I/O address is generated on the address bus 3 (AB0-AB4) by the controller processor 2. It is coupled to the I/O address bus 25 by a set of I/O address gates 26 which are enabled when a logic high voltage is generated on an "I/O SEL" control line 27. In addition to the I/O address, the gates 26 couple a "MEMR" control line 28 and a "WO" control line 29 to each of the interface racks 20-23 through a read line 30 and a write line 31. A strobe line 27 also connects to each rack 20-23 to indicate when an input or output function is to be performed.

Data is coupled between the controller processor 2 and the I/O interface racks 20-23 through an eight-bit I/O data bus 32 and a set of eight I/O data gates 33. When a logic high voltage is generated on the read line 30, eight bits of data are gated onto the I/O data bus 32 by the addressed I/O card and is coupled to the data bus 1 by the I/O data gates 33. Conversely, when a logic high is generated on the write control line 31, an eight-bit output data word is coupled from the controller processor 2, through the I/O data gates 33 and to an addressed output card in one of the I/O interface racks 20-23. The I/O data gates 33 are controlled by a "BE" control line 34 which is driven to a logic high voltage when data is to be outputted to the I/O interface racks 20-23, and an "RLE" control line 35 which is driven high when input data is to be received from an addressed I/O card. A "CL" control line 36 synchronizes the operation of the I/O data gates 33 with that of the controller processor 2.

As will be explained in more detail hereinafter, the control program stored in the RAM 4 is repeatedly executed, or scanned, by the controller processor 2 when in the "run" mode. Each scan through the control program requires less than twenty milliseconds (the exact time depends on the length of the control program 10 and the types of instructions contained therein) and after each such scan, an I/O scan routine is executed to couple data between the I/O interface racks 20-23 and the I/O image table 8 in the RAM 4. The I/O image table stores an input status data word and an output status data word for each I/O card in the interface racks 20-23. Each data word in the I/O image table is thus associated with a specific card in one of the I/O interface racks 20-23. Each input status word is an image of the state of eight sensing devices cnnected to its associated I/O card and each output status word is an image of the desired state of any operating devices connected to its associated I/O card. If a particular I/O slot contains an input card, the output status word in the I/O image table 8 which corresponds to that slot is meaningless and would be blank. Although this is a somewhat inefficient use of memory space it does allow either input or output cards to be inserted freely in any I/O slot.

The I/O scan is made after each scan, or execution, of the control program 10. The I/O scan is a programmed sequence in which output status words are sequentially coupled from the I/O image table 8 to their associated I/O cards and input status words are sequentially coupled from the I/O cards to their associated memory locations in the I/O image table 8. As will become apparent from the discussion to follow, the controller processor 2 operates on data in the I/O image table 8 rather than data received directly from the I/O interface racks 20-23. This allows the processor to operate at maximum speed to execute the control program 10 in a minimum amount of time while at the same time minimizing the data rates in the I/O data bus 32 and the I/O address bus 25. The latter consideration is important since lower data rates allow the use of more effective noise immunity circuits which are so necessary in an industrial environment.

It is a basic concept of the present invention that in addition to the I/O scan which is performed periodically, I/O data is coupled between selected I/O cards and their associated memory locations in the I/O image table 8 in response to special controller type instruction referred to hereinafter as "I/O immediate instructions." In contrast to the I/O scan, however, only a selected I/O card is involved in the data transfer which occurs in response to an I/O immediate instruction. The I/O card which is involved is identified by an address code in the I/O immediate instruction.

Figure 2:
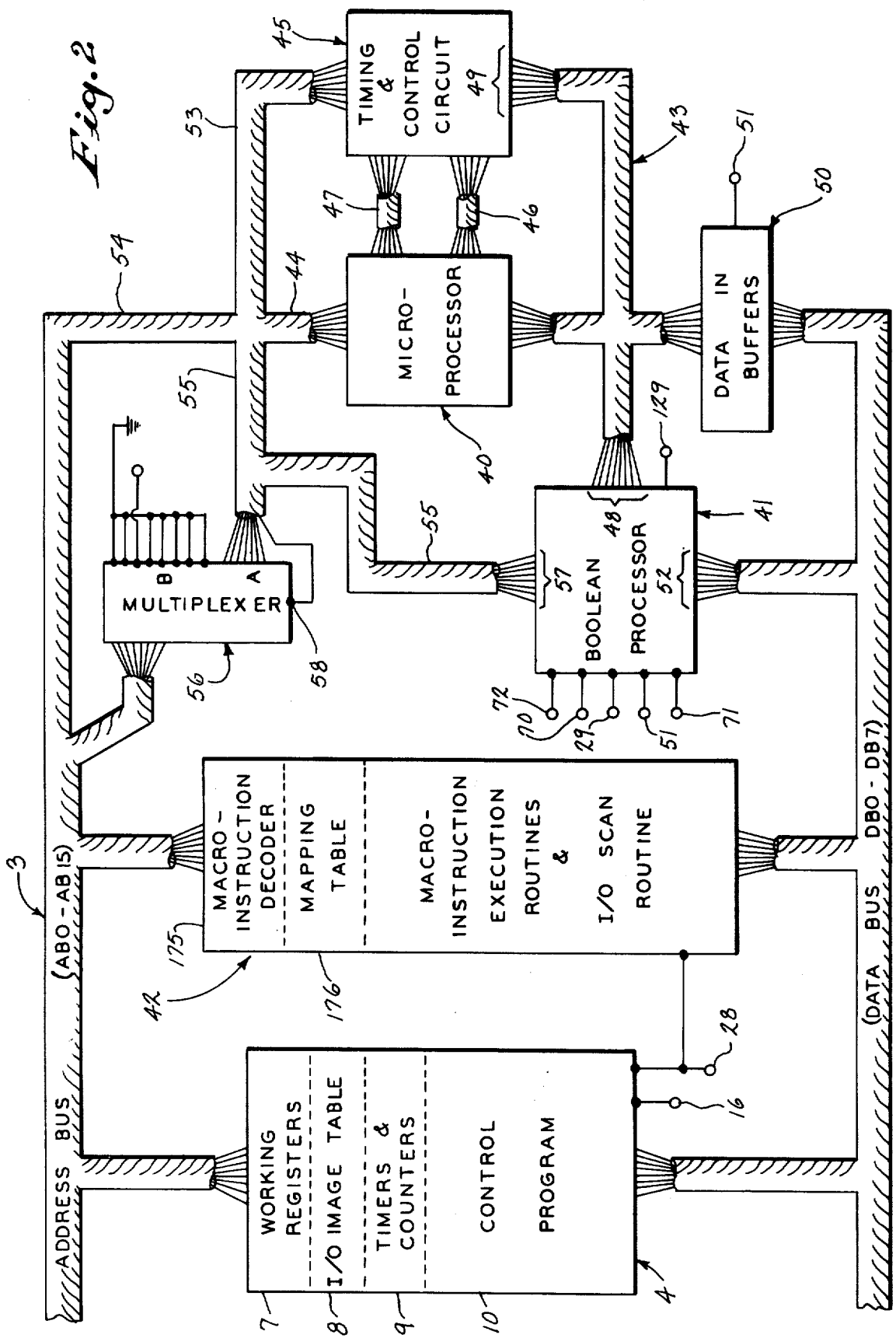
FIG. 2 is an electrical block diagram of the controller processor and random access memory which form part of the controller of FIG. 1.
Figure 3A:
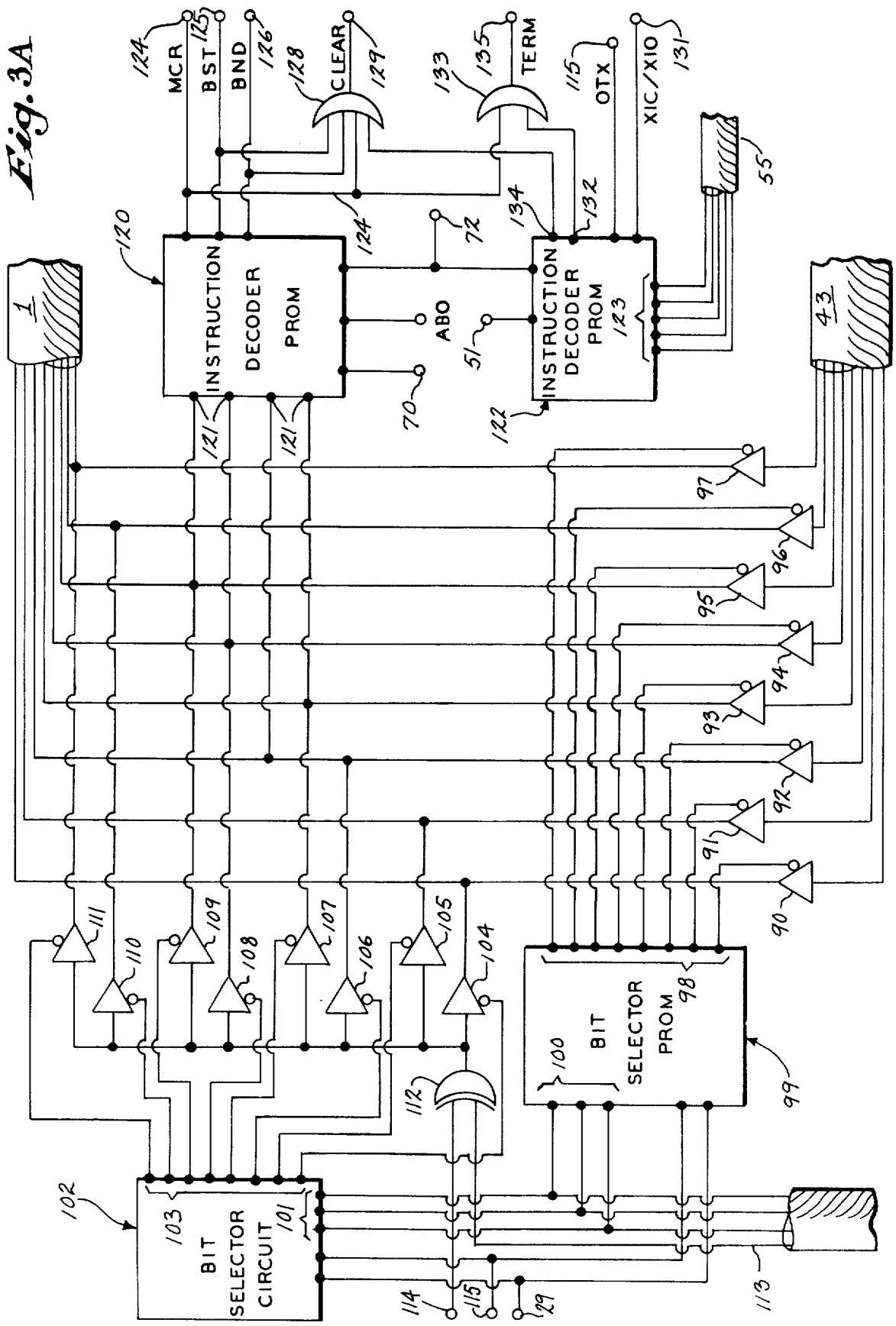
FIGS. 3a and 3b are electrical schematic diagrams of the Boolean processor which forms part of the controller processor of FIG. 2.
Figure 3B:
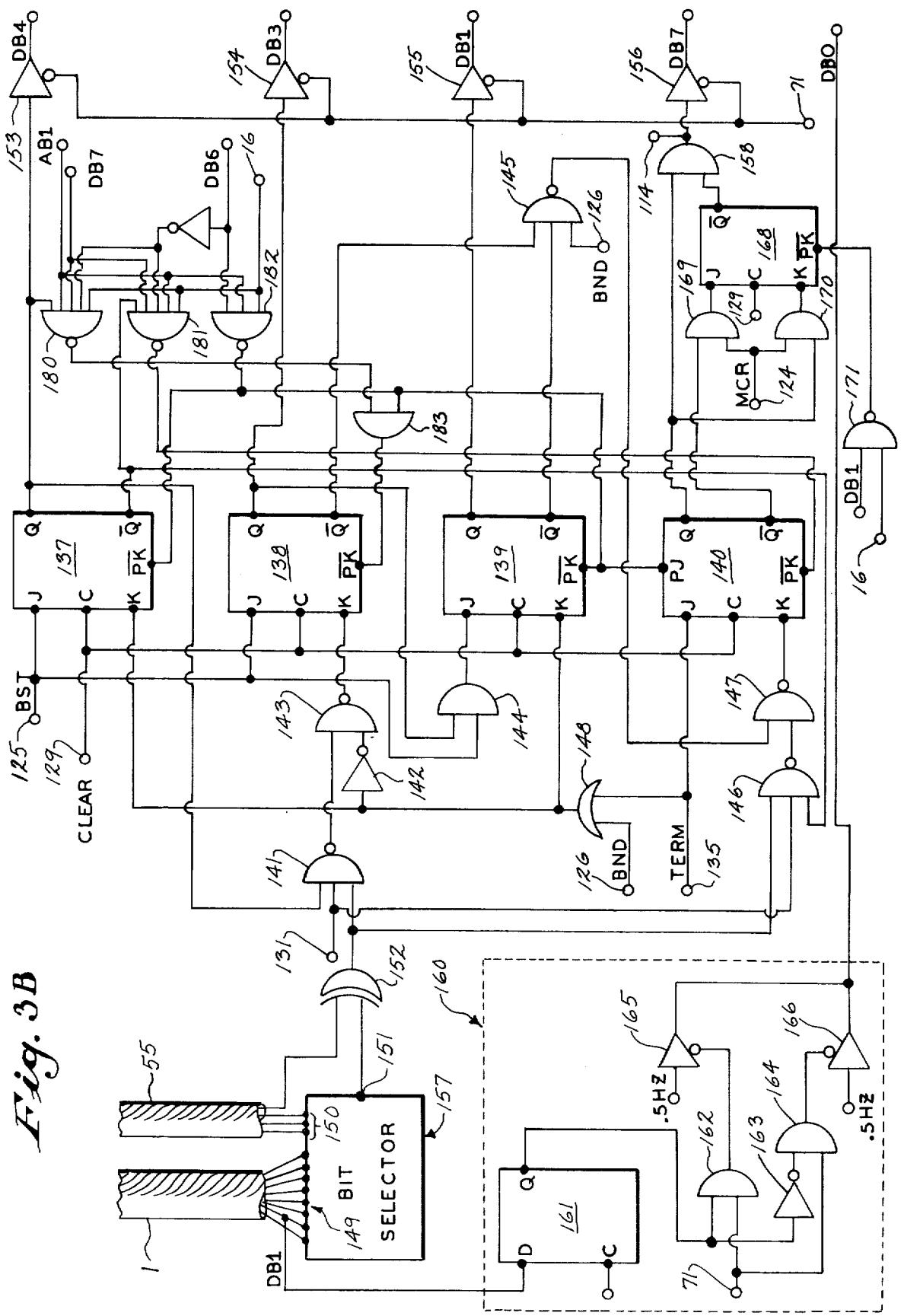

Referring particularly to FIG. 2, the controller processor 2 is comprised of a programmed microprocessor 40, a hardwired Boolean processor 41 and supporting circuitry. The programs for the microprocessor are stored in a read-only memory (ROM) 42 which stores up to eight thousand machine instructions. The microprocessor 40 is an eight-bit, seventy-two instruction, LSI chip manufactured by the Intel Corporation and sold as the Model 8080. Numerous types of microprocessors are available and reference is made to the publication "Intel 8080 Microcomputer Systems User's Manual," dated September, 1975, for a complete description of the structure, operation and instruction set of the microprocessor 40 employed in the preferred embodiment of the present invention. The Boolean processor 41 is a special purpose hardwired circuit which is illustrated in FIGS. 3a and 3b and which will be described in more detail hereinafter.

The microprocessor 40 transfers data and internal state information on an eight-bit bidirectional, three-state processor date bus 43 (DO-D7). The memories 4 and 42, the program panel 11 and the I/O interface racks 20-23 are addressed by the microprocessor 40 through a sixteen-bit, three-state processor address bus 44. Three timing and control outputs (WR, SYNC, and DBIN) emanate from the microprocessor 40 and connect with a timing and control circuit 45 through a bus 46. Four control inputs (READY, RESET, $\phi 1$ and $\phi 2$) connect the timing and control circuit 45 to the microprocessor 40 through a bus 47.

The processor data bus 43 connects to a set of eight inputs 48 on the Boolean processor 41, to eight inputs 49 on the timing and control circuit 45 and to the outputs of eight data in buffer gates 50. The inputs of the data in buffer gates 50 connect to the respective leads DB0-DB7 in the data bus 1 and data is gated from the bus 1 to the microprocessor 40 when a logic high voltage is applied to a "DBIN" control line 51. All data outputted by the microprocessor 40, except for that applied to the timing and control circuit 45, is coupled through the Boolean processor 41 and applied thereby to the data bus 1 at a set of terminals 52.

The processor address bus 44 divides to form a number of branches which connect to programmable controller system elements. A branch 53 formed by leads AB1, AB2, AB13, AB14 and AB15 connects to the timing and control circuit 45, a branch 54 formed by leads AB0-AB7 connects directly to the corresponding leads in the address bus 3, and a third branch 55 formed by leads AB8-AB15 connects to the A inputs on a multiplexer 56 and the inputs 57 on the Boolean processor 41. The lead AB15 in the branch 55 connects to a select terminal on the multiplexer 56, and depending on its logic state, either the leads in the branch 55 are coupled to the leads AB8-AB15 in the address bus 3 or a constant which is applied to the B inputs on the multiplexer 56 is coupled to the address bus 3.

The constant imposed through the multiplexer 56 generates the address $8192_{10}$ (hereinafter referred to as 8K) which is that of the first line in the RAM 4. When this constant is imposed on the address bus 3, the address on the lowest eight bits AB0-AB7 which emanate directly from the microprocessor 40 thus selects one of the first 256 lines in the RAM 4. These lines store the working registers 7, the I/O image table 8 and the timers and counters 9 which are associated with the execution of programmable controller type instructions. As a consequence, when data is to be written into or read from the first 256 lines of the RAM 4, the processor address bus leads AB8-AB14 are free to convey control information through the branch 55 to the Boolean processor 41. As will be described in more detail hereinafter, this information indicates in part the type of programmable controller function which is to be performed by the Boolean processor 41 and it indicates which, if any, bit on the data bus 1 is involved in that function. When a status bit in the I/O image table 8 is to be examined, for example, the address of the memory line which stores that bit is generated on address bus lines AB0-AB7 along with the 8K constant on address bus lines AB8-AB15. Simultaneously, a bit pointer code is coupled to the Boolean processor 41 through the branch 55 to identify which bit on the addressed memory line is to be examined.

Figure 4:
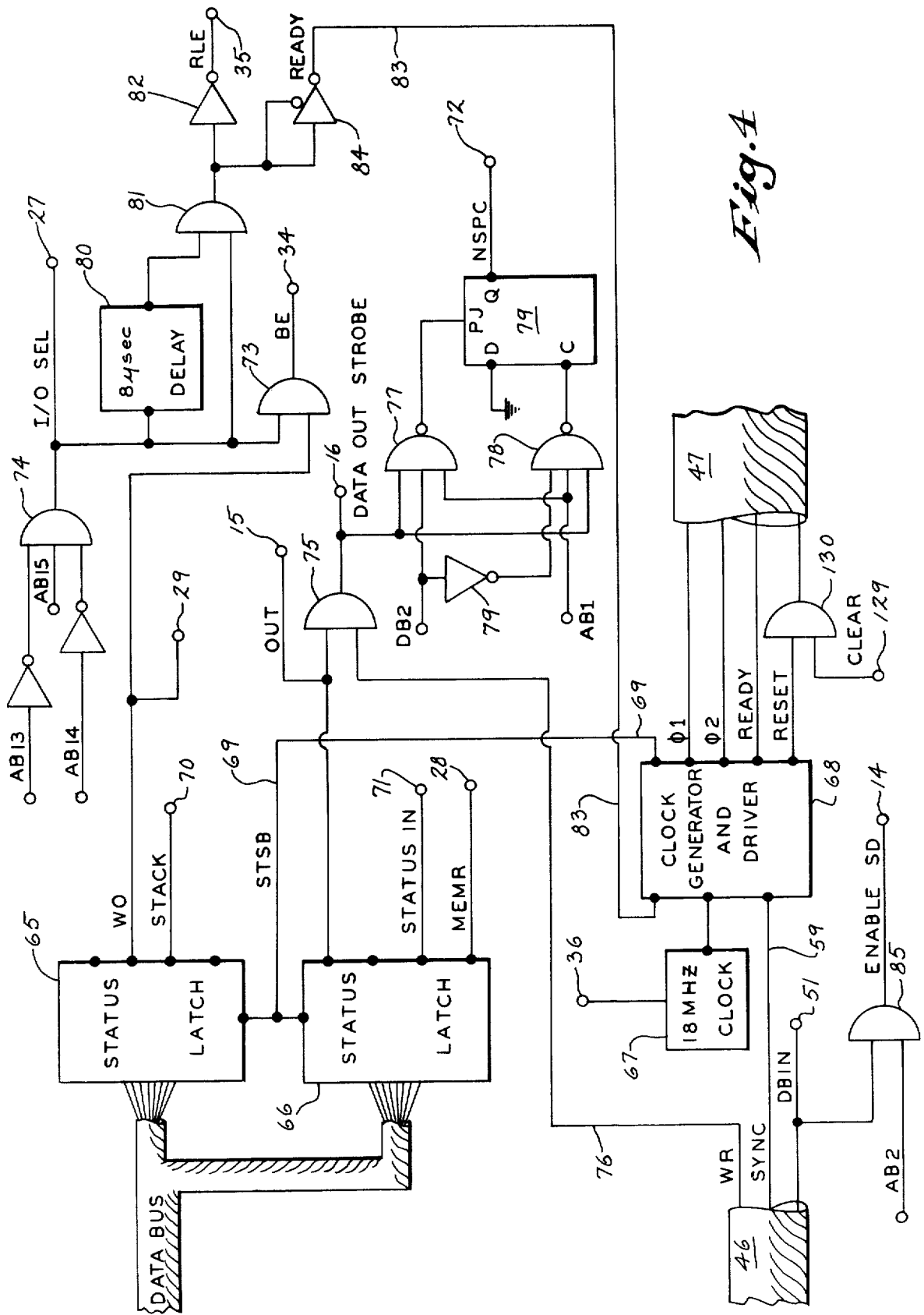
FIG. 4 is an electrical schematic diagram of the timing and control circuit which forms part of the controller processor of FIG. 2.

Referring particularly to FIGS. 2 and 4, the microprocessor 40 controls the various elements of the controller processor 2 and it in turn is controlled by instructions stored in the ROM 42. The microprocessor sequentially fetches such instructions from the ROM 42, stores each in its internal instruction register, and executes it. Each instruction requires from one to five machine cycles and each machine cycle consists of from three to five states. At least one machine cycle is required to fetch an instruction from the ROM 42 and the remaining portion of the instruction cycle is employed to execute the instruction. Some instructions require only a fetch machine cycle while others require additional cycles to read data from the RAM 4, write data into the RAM 4 or receive or transmit data to an I/O device. At the beginning (during the first state) of each machine cycle the microprocessor generates a SYNC control signal to the timing and control circuit 45 through the bus 46. Concurrently, the microprocessor generates a status word on the processor data bus 43 which identifies the nature of the machine cycle in progress. This status word is saved in latches 65 and 66 in the timing and control circuit 45 and is used thereby to develop the control signals which operate the various elements of the controller.

Referring particularly to FIG. 4, the timing and control circuit 45 includes an 18 megahertz clock 67 which connects to the clock input of a clock generator and driver circuit 68 and to the CL control line 36 which operates the I/O data gates 33. The clock generator and driver circuit 68 generates two nonoverlapping clock pulse trains $\phi 1$ and $\phi 2$ which are coupled to the microprocessor 40 through the bus 47. The microprocessor 40 generates its sync signal through the sync control line 59 to the clock generator 68 at the beginning of each machine cycle and the circuit 68 in turn generates a logic high voltage on an "STSB" control line 69 to the enable terminals on the status latches 65 and 66. A timing diagram illustrating the relationship of the $\phi 1$, $\phi 2$, SYNC and STSB signals is shown in FIG. 5.

A number of control signals are derived directly from the status word stored in the latches 65 and 66. These include the WO control signal on the control line 29 which indicates that data is to be outputted to an I/O interface rack 20-23, the OUT control signal on the line 15 which indicates that data is to be outputted to the UAR/T 12, and the MEMR control signal on the line 28 which indicates that data is to be inputted from an I/O interface rack 20-23 or read from one of the controller memories 4 or 42. Two additional control signals for the Boolean processor 41 are generated directly from the status word in the latches 65 and 66. These include a "STACK" signal generated on a control line 70 and a "STATUS IN" signal generated on a control line 71. These control signals are present for the entire machine cycle, or in other words, until a new status word is generated by the microprocessor 40 at the beginning of the next machine cycle.

A number of control signals are derived indirectly from the control signals generated by the status latches 65 and 66. These include the BE signal on the control line 34 which indicates that data is to be outputted to an I/O interface rack 20-23 through the I/O data gates 33, the DATA OUT STROBE signal on the control line 16 which indicates that data is to be transmitted to the program panel 11 by the UAR/T 12, and an "NSPC" control signal which is applied to the Boolean processor 41 through a control line 72. More specifically, the BE signal is derived from an AND gate 73 which has one input connected to the WO control line 29 and a second input connected to the I/O SEL control line 27. The I/O SEL control signal is in turn derived from an AND gate 74 which receives bit 15 in the address bus 3 and the inversion of bits 13 and 14 in the address bus 3. The I/O SEL control line 27 is driven high when an I/O interface rack 20-23 is to be addressed for the purpose of coupling data to it or receiving data from it. The BE control signal, therefore, indicates that data is to be outputted to the addressed I/O interface rack 20-23. The DATA OUT STROBE signal is derived from an AND gate 75 which has one input connected to the OUT control line 15 and a second input connected to a "WR" control line 76 which connects with the microprocessor 40 through the bus 46. The NSPC signal is derived from a circuit which comprises a pair of NAND gates 77 and 78 and a D-type flip-flop 79. One input on each NAND gate 77 and 78 connects to the DATA OUT STROBE control line 16 a second input on each connects to bit one in the address bus 3. Bit two in the data bus 1 connects to a third input on the NAND gate 77 and to a third input on the NAND gate 78 through an inverter gate 79. The NSPC control line 72 connects to the Boolean processor 41 and its general function is to enable the processor 41 to decode data on the processor data bus 43 and address bus branch 55 when the data is intended for the Boolean processor 41.

The RLE control signal on the line 35 and the ENABLE SD control signal on the line 14 are derived independently of the status word in the latches 65 and 66. The RLE control signal is coupled to the I/O SEL control line 27 through an eight-microsecond time delay 80 and a pair of gates 81 and 82. When the I/0 SEL control line 27 goes high, an I/O address is generated to the I/O interface racks 20-23. The eight-microsecond delay allows time for this I/O address to propagate along the I/O address bus 25 and for it to be decoded by the appropriate I/O adapter circuit 24. The RLE control line is held at a logic low for eight microseconds and is then driven to a logic high voltage to enable the I/O data gates 33 to receive data from the proper I/O slot. To hold the microprocessor 40 during this time delay a "READY" control line 83 is driven low by a tri-state inverter gate 84 during the eight-microsecond time period. This line 83 is connected to an input on the clock generator and driver circuit 68 and during a data input operation the microprocessor 40 is held, or stopped, until the eight-microsecond delay period has expired. The enable SD control signal on the line 14 is derived from an AND gate 85 which has one input connected to receive the DBIN control signal generated by the microprocessor 40 on the control line 51 and a second input connected to receive bit two of the address bus 3. The enable SD signal enables the receipt of data from the program panel 11.

Although the microprocessor 40 functions in response to machine language instructions stored in the ROM 42, the overall function of the programmable controller is governed by the programmable controller type instructions stored in the control program portion 10 of the RAM 4. These programmable controller type instructions are treated as "macro-instructions" in that they are executed by a series of microprocessor machine instructions. The programmable controller instruction set includes three general types: bit instructions; word instructions; and control instructions. Bit instructions and word instructions are stored on two memory lines, the first line storing an operation code and the second line storing an operand address. The control instructions are comprised solely of a two-line operation code. The bit instructions include the following:

TABLE 1

| MNEMONIC | BIT POINTER | | | OPERATION CODE | | | | EXECUTION TIME |
|---|---|---|---|---|---|---|---|---|
| XIC/XOE | X | X | X | 0 | 1 | 0 | 1 | 1 | 12.5 usec. |
| XIO/XOD | X | X | X | 1 | 1 | 0 | 1 | 1 | |
| OTU | X | X | X | 1 | 0 | 1 | 1 | 1 | |
| OTL | X | X | X | 0 | 0 | 1 | 1 | 1 | 16.5 usec. |
| OTD | X | X | X | 1 | 1 | 1 | 1 | 1 | |
| OTE | X | X | X | 0 | 1 | 1 | 1 | 1 | |
| INSTRUCTION BIT NUMBER | 0 | 1 | 1 | 3 | 4 | 5 | 6 | 7 | |

The operations performed by these bit instructions are briefly defined as follows:

XIC—Examine status bit closed or, is the status bit in a logic 1 state?

XOE—Same as XIC, but refers to a status bit in the output image table.

XIO—Examine status bit open or, is the status bit in a logic 0 state?

XOD—Same as XIO, but refers to a status bit in the output image table.

OTU—If conditions are true turn status bit off, or to a logic 0 state, and if false do nothing.

OTL—If conditions are true turn status bit on, or to a logic 1 state, and if false do nothing.

OTD—If conditions are true turn status bit off and if conditions are false turn status bit on.

OTE—If conditions are true turn status bit on and if conditions are false turn status bit off.

The control instructions include the following:

TABLE II

| MNEMONIC | OPERATION CODE | | | | | | | EXECUTION TIME |
|---|---|---|---|---|---|---|---|---|
| NOP | X | 0 | 0 | 0 | 0 | 0 | 0 | |
| BND | X | X | X | 0 | 0 | 0 | 1 | 1 |
| BST | X | X | X | 1 | 0 | 0 | 1 | 1 | 8.5 usec. |
| MCR | X | X | X | 1 | 1 | 1 | 0 | 1 |
| END | 0 | 0 | 1 | 0 | 0 | 1 | 0 | 0 | 100 usec. |
| INSTRUCTION BIT NUMBER | 0 | 1 | 2 | 3 | 4 | 5 | 6 | 7 |

Note: X signifies "don't care"

The operations performed by these control instructions are briefly defined as follows:

NOP—No operation
BND—Branch end: termination of a Boolean sub-branch
BST—Branch start: opens or begins a Boolean sub-branch
END—End of the control program
MCR—Operate master control flip-flop The word type programmable controller instructions include the following:

TABLE III

| MNEMONIC | OPERATION CODE | EXECUTION TIME |
|---|---|---|
| TOF 0.1 sec. | 0 0 0 1 0 0 0 0 | |
| TOF 1.0 sec. | 0 1 0 1 0 0 0 0 | |
| TON 0.1 sec. | 0 0 1 1 0 0 0 0 | 100 usec. |
| TON 1.0 sec. | 0 1 1 1 0 0 0 0 | |
| RTO 0.1 sec. | 0 0 0 0 1 0 0 0 | |
| RTO 1.0 sec. | 0 1 0 0 1 0 0 0 | |
| CTD | 0 1 1 0 1 0 0 0 | |
| CTU | 0 0 1 0 1 0 0 0 | 100 usec. |
| RTR | 0 1 0 0 0 1 0 0 | |
| CTR | 0 0 0 0 0 1 0 0 | |
| PUT | 0 1 0 1 1 0 0 0 | |
| GET | 0 0 0 1 1 0 0 0 | 100 usec. |
| EQU | 0 0 1 1 1 0 0 0 | |
| LES | 0 1 1 1 1 0 0 0 | |
| JMP | 0 1 0 0 1 1 0 0 | |
| RTN | 0 1 1 1 0 1 0 0 | 100 usec. |
| LBL | 0 0 0 0 1 1 0 0 | |
| INSTRUCTION BIT NUMBER | 0 1 2 3 4 5 6 7 | |

The operations performed by these word-type instructions are briefly defined as follows:

TOF—If conditions are true turn output on, otherwise, wait until time is out then turn output off.
TON—If conditions are true wait until time is out then turn output on, otherwise, turn output off.
RTO—If conditions are true wait until time is out then turn output on, otherwise, stop timer.
CTD—If the conditions are true reduce the count by one.
CTU—If the conditions are true increase the count by one.
PUT—If conditions are true write the number in the microprocessor accumulator in the selected memory line, otherwise, do nothing.
RTR—If the conditions are true reset the timer.
CTR—If the conditions are true reset the counter.
GET—Fetch the word on the selected memory line and store in the microprocessor accumulator.
EQU—Is the value stored in the microprocessor accumulator equal to the value stored on the selected memory line?
LES—Is the value stored in the microprocessor accumulator less than the value stored on the selected memory line?
JMP—Unconditional jump to the target address indicated by associated operand.
LBL—Load memory address into jump table.
RTN—Return to jump instruction with associated operand.

The operand address which is associated with each of these word-type operation codes is an eight-bit address which, when combined with the 8K constant, is a memory address of a line in the RAM 4.

The programmable limit instructions of the present invention are word-type instructions and they include the following:

TABLE III A

| MNEMONIC | OPERATION CODE 0 1 2 3 4 5 6 7 | EXECUTION TIME |
|---|---|---|
| GB | 0 1 1 1 0 1 0 0 | 62.5 usec. |
| LT | 0 1 0 1 1 1 0 0 | 92 usec. |

The operations performed by these instructions are briefly defined as follows:

GB—Get the eight-bit octal number stored in the I/O image table at the location indicated by the operand address and store in microprocessor C register.
LT—If the octal number in C register is greater than or equal to a lower limit or less than or equal to an upper limit do nothing, otherwise insert false indication into Boolean processor logic unit. The upper and lower limits are stored in the RAM 4 at locations indicated by the associated operand address.

The programmable controller type instructions are executed by the combined operation of the microprocessor 40 and the Boolean processor 41. Referring particularly to FIG. 2, the Boolean processor 41 is connected to the processor data bus 43 to receive data directly from the microprocessor 40, and is connected to the data bus 1 to both receive data from the RAM 4 and to generate data to both the RAM 4 and the microprocessor 40. The operation of the Boolean processor 41 is controlled through the lines which connect it to the timing and control circuit 45 (i.e., WO 29, DBIN 51, STACK 70, STATUS IN 71 and NSPC 72). In addition, the Boolean processor 41 is responsive to the operation codes in programmable controller type instructions which are received directly from the RAM 4 or indirectly through the microprocessor 40.

Referring particularly to FIG. 3a, the leads (D0-D7) in the processor data bus 43 which connect to the Boolean processor 41 couple through respective tri-state gates 90-97 to the corresponding leads (DB0-DB7) in the data bus 1. The control terminals on the tri-state gates 90-97 connect to respective outputs 98 on a bit selector prom 99, and in response to a bit pointer code received at a set of three prom input terminals 100, one of the gates 90-97 may be selectively opened to decouple its associated processor bus lead from its associated data bus lead. The bit pointer code is received from the microprocessor 40 through the bus 55 and it is also applied to the input terminals 101 of a bit pointer circuit 102. In response, the bit pointer circuit 102 generates a logic low voltage at a selected one of its eight output terminals 103, each of which connects to the respective control terminals on a set of eight output tri-state gates 104-111. The input of each gate 104-111 connects to an exclusive OR gate 112 and their outputs connect to the respective leads DB0-DB7 in the data bus 1. One input on the exclusive OR gate 112 connects to the bus 55 through a lead 113 to receive bit number eleven in the processor address bus 44 and its second input connects to a "decision" line 114. The bit selector prom 99 and the bit pointer circuit 102 are enabled through an "OTX" line 115 and they are clocked by the WO signal on the control line 29.

As will be described in more detail hereinafter, the logic state of the decision line 114 represents the solution of a Boolean expression and it is in essence the logic output of the Boolean processor 41. This logic output indicates that a particular status bit in the I/O image table 8 is to be set at a logic one or logic zero state. The memory line containing the particular bit to be set is indicated by the operand address of one of the programmable controller type instructions OTE, OTD, OTL or OTU. The I/O image table status word is read from the RAM 4 into the microprocessor 40 and is then written back into the RAM 4 by coupling it through the Boolean processor 41. The bit pointer code indicates which status bit in this status word is to be altered as it passes through the Boolean processor 41, and when the WO control line 29 goes high, the appropriate tri-state gate 90-97 is disabled by the bit selector prom 99 and the corresponding output tri-state gate 104-111 is enabled by the bit pointer circuit 102. By thus coupling the logic state of the decision line 114 to the appropriate lead in the data bus 1, the proper status bit is set while the I/O image table status word is "on the fly" between the microprocessor 40 and the RAM 4.

Referring still to FIG. 3a, the Boolean processor 41 is responsive to a number of the operation codes in programmable controller type instructions which are read from the RAM 4 by the microprocessor 40. The control type instruction operation codes (MCR, BST, BND) are applied to an instruction decoder prom 120 which has a set of four inputs 121 connected to data bus leads DB2-DB6 and the bit instruction operation codes (XIC, XIO, OTE, OTL, OTD, OTU) are applied to an instruction decoder prom 122 which has a set of five input terminals 123 connected to receive processor address bus leads AB11-AB15 through the bus 55.

The instruction decoder prom 120 is enabled by logic high voltages applied to inputs which connect respectively to the STACK control line 70, the NSPC control line 72 and the bit zero lead (AB0) in the processor address bus 44. When thus enabled, a logic high voltage is generated by the prom 120 on an "MCR" line 124 when an MCR operation code is present on the data bus 1. Similarly, a logic high voltage is generated on a "BST" line 125 when a BST operation code is present, or a logic high voltage is generated on a "BND" line 126 when a BND operation code is present. The MCR, BST and BND control lines 124, 125 and 126 separately connect to the logic unit portion of the Boolean processor 41 illustrated in FIG. 3b. All three outputs of the instruction decoder prom 120 connect to inputs on an OR gate 128 and the output of the OR gate 128 connects to a "clear" control line 129. The clear control line 129 signals the completion of the execution of a programmable controller instruction and it connects to elements of the logic unit illustrated in FIG. 3b and to an AND gate 130 in the timing and control circuit of FIG. 4. The clear line 129 signals the microprocessor 40 that the Boolean processor 41 has completed its function and that another controller instruction can be read from the RAM 4 and executed.

The instruction decoder prom 122 is controlled by the DBIN control line 51 and the NSPC control line 72. When an XIC, XIO, XCF or XOF operation code appears on the bus 66, a logic high voltage is generated by the prom 122 on an "XIC/XIO" line 131, and when an OTE, OTD, OTL, OTU or OEF operation code is present, a logic high voltage is generated on the OTX line 115. The OTX line 115 connects to the bit selector prom 99 and the bit pointer prom 102 as described above. The XIC/XIO line 131 connects to elements of the logic unit in FIG. 3b and a third output 132 on the decoder prom 122 connects to one input on an OR gate 133. A fourth output 134 connects to an input on the OR gate 128. A second input on the OR gate 133 connects to the MCR line 124 and the output of the gate 133 connects to a "TERM" line 135. The output 134 enables the OR gate 128 when either the OTX line 115 or the XIC/XIO line 131 goes high whereas the output 132 enables the OR gate 133 when the OTX line 115 goes high. The TERM line 135 is thus driven high when one of the "terminating" operation codes OTE, OTD, OTL, OTU or MCR is present.

Referring particularly to FIG. 3b, the logic unit portion of the Boolean processor 41 includes a set of four flip-flops 137-140 which are interconnected by a set of logic gates 141-148. The input to the logic unit is a bit selector 157 which has a set of eight inputs 149 connected to the respective leads DB0-DB7 in the data bus 1. The bit selector 157 also includes a set of three bit-select inputs 150 which connect to the bus 55 to receive the bit pointer code generated by the microprocessor 40 on address bus leads eight, nine and ten. In response to this bit pointer code, the bit selector 157 couples the logic state, or status, of one of the data bus leads DB0-DB7 to an output terminal 151. The output terminal 151 connects through an exclusive OR gate 152 to an input on the respective logic unit NAND gates 141 and 146 and a second input on the exclusive OR gate 152 connects to the bus 55 to receive address bus bit number eleven. The exclusive OR gate 152 operates to invert the logic state of the selected status bit when an XIO or XOF instruction is being executed and it thus serves to distinguish the XIO from the XIC and the XCF from the XOF operation codes. A second input on each of the NAND gates 141 and 146 connect to the XIC/XIO line 131 and a third input on the NAND gate 141 connects to the Q output of flip-flop 137. The output of NAND gate 141 couples through NAND gate 143 to the K input of flip-flop 138 and the output of NAND gate 146 couples through NAND gate 147 to the K input of flip-flop 140. The TERM line 135 and the BND line 126 connect through the OR gate 148 to the K inputs on flip-flops 137 and 139 and to the inverter gate 142. The output of inverter gate 142 connects to a second input on the NAND gate 143 and the TERM line 135 connects to the J input on the flip-flop 140. The clear line 129 connects to the clock terminals on each of the flip-flops 137-140 and the BST line 125 connects to one input of AND gate 144 and the J terminals on the flip-flops 137 and 139. The AND gate 144 also couples the Q output of flip-flop 138 to the J input of flip-flop 139. The BND line 126 connects to one input on NAND gate 145 and the $\overline{Q}$ outputs on the flip-flops 138 and 139 connect to respective second and third inputs on the NAND gate 145. The output of NAND gate 145 is coupled to the K input on flip-flop 140 by the NAND gate 147 and the $\overline{Q}$ output of flip-flop 137 connects to a third input on the NAND gate 146.

The Q output of the flip-flop 140 serves as the logic unit output and it couples through an AND gate 158 to the decision line 114. In addition, the Q outputs of the flip-flops 137-140 are coupled to respective data bus leads DB4, DB3, DB1 and DB7 by respective tri-state gates 153-156. The control terminal on each tri-state gate 153-156 is connected to the STATUS IN line 71, and when a logic high voltage is generated thereon by the timing and control circuit 45, the status of the logic unit flip-flops 137-140 are gated onto the data bus 1 and into the microprocessor 40.

The MCR control instruction may be employed to effectively disable the logic unit during the execution of specified portions of the control program. Referring to FIG. 3b, a master control flip-flop 168 has its $\overline{Q}$ output connected to the AND gate 158 to couple or decouple the logic unit output from the main decision flip-flop 140. A pair of AND gates 169 and 170 connect to its J and K inputs respectively and its clock input connects to the CLEAR line 129. One input on each AND gate 169 and 170 connects to the MCR line 124 and second inputs thereon connect to the $\overline{Q}$ and Q outputs on the main decision flip-flop 140. If the main decision flip-flop 140 is in its false state, and MCR control instruction is executed, the flip-flop 168 is set. Its $\overline{Q}$ output thus is driven to a logic low state to disable the AND gate 158. All Boolean equations subsequently executed by the logic unit will be false until another MCR control instruction is executed which sets the flip-flop 168. The master control flip-flop 168 can also be reset directly through its $\overline{PK}$ terminal which is driven by a NAND gate 171 that connects to data out strobe line 16 and data bus lead one (BD1).

In addition to reading the status of the logic unit flip-flops 137-140 onto the data bus 1, the status thereof can be set directly by a microprocessor instruction (STATUS OUT). This is accomplished by a set of three NAND gates 180-182 and an AND gate 183 which are connected as shown in FIG. 3b to the flip-flop $\overline{PK}$ and $\overline{PJ}$ terminals. When the logic unit is addressed (i.e., AB1 is at a logic high voltage) data on data bus leads DB6 and DB7 is gated into the logic unit by the data out strobe line 16. A decision (true or false) may thus be coupled from the microprocessor 40 into the appropriate flip-flops of the logic unit in FIG. 3b.

Referring particularly to FIG. 2, the execution of the control program 10 stored in the RAM 4 is under the direction of a control instruction decoder program 175 stored in the ROM 42. This program 175 makes use of a number of internal registers in the microprocessor, including the following:

(PC)  16-bit program counter;
(SP)  16-bit "stack" pointer;
(B) and (C)  8-bit registers arranged as a pair;
(D) and (E)  8-bit registers arranged as a pair; and
(H) and (L)  8-bit registers arranged as a pair.

The program counter (PC) stores the memory address of the current machine instruction. During an instruction fetch this memory address is generated on the address bus 3 and the program counter (PC) is then incremented one or several counts. The stack pointer (SP) stores the memory address of the next programmable controller type instruction to be executed. It is initialized to point at the first controller instruction in the control program 10, and after each controller instruction is executed, the stack pointer (SP) is incremented two counts to address the next controller instruction in the control program 10. The six general purpose registers (B, C, D, E, H and L) are used either singly as eight-bit registers or as sixteen-bit register pairs. The microprocessor 40 also includes an eight-bit instruction register which stores the first eight-bit byte of a machine instruction fetched from the ROM 42.

The machine instructions which comprise the macro-instruction decoder program 175 are as follows:

| MNEMONIC | OPERAND | COMMENT |
|---|---|---|
| POP | H | Load controller instruction indicated by stack pointer (SP) into the H and L registers. |
| MOV | E,M | Get status word from I/O image table 8 indicated by address in L register and apply controller instruction operation code and bit pointer code stored in H register to Boolean processor 41 through the latch 57. |
| MOV | M,E | Store status word back in I/O image table 8. |
| MVI | D,ADRH | Store constant (8K) in D register. |
| MOV | E,L | Transfer memory address stored in L register to E register. |
| MOV | L,H | Transfer controller instruction operation code in H register to L register. |
| MOV | B,L | Transfer controller instruction operation code and bit pointer code to B register. |
| MVI | H,000 | Load zeros into H register. |
| DAD | H | Shift contents of H and L registers to the left one bit. |
| IN | STATUS | Input status of Boolean processor 41 and store in A register. |
| ANA | A | Logical AND contents of A register with itself to put status of decision flip-flop 140 into microprocessor ALU flag register. |
| PCHL | | Perform indirect jump to control instruction execution routine by loading memory address stored in mapping table 176 into program counter (PC). |

Only the first machine instruction (POP H) listed in the program above is executed when the controller instruction read from the RAM 4 is a BST, BND, or MCR. The POP H instruction reads the controller instruction operation code out of the RAM 4 and enables the instruction decoder prom 120 in the Boolean processor 41. The controller instruction operation code is generated on the data bus 1 in response to this machine instruction, and the BST, BND or MCR code is decoded by the prom 120. A logic high voltage is thus generated on the appropriate line 125, 125, or 126 to the logic unit and a logic high voltage is generated on the "clear" line 129 through the output 134. The logic unit portion (FIG. 3b) responds immediately and no further data or operations are required. The logic high voltage on the clear line 129 resets the microprocessor program counter (PC) to zero through the AND gate 130 in the timing and control circuit 45 (FIG. 4), and as a consequence, the POP H machine instruction is again executed to read out the next controller instruction from the RAM 4. Only one instruction cycle of approximately 8.5 microseconds is thus required to execute a BST, BND, or MCR type programmable controller instruction.

Referring particularly to FIGS. 2, 3a and 3b, only the first two machine instructions (POP H and MOV E,M) are required to execute an XIC or an XIO controller instruction. The first machine instruction (POP H) reads the operation code and operand address out of the RAM 4 and loads them into the microprocessor H and L registers respectively. The second machine instruction (MOV E,M) is then executed and the operation code stored in the H register appears on the processor address bus leads AB8-AB15. The multiplexer 56 blocks these eight bits and in place of them, generates the constant (8K) on the leads AB8-AB15 of the address bus 3. The eight-bit macro-instruction operand in the L register appears on the address bus leads AB0-AB7 during the execution of the MOV E,M machine instruction and it serves to select one of the memory addresses $8192_{10}$ to $8448_{10}$ in the I/O image table 8 or the timers and counters portion 9 of the RAM 4. The controller, or macro-instruction operation code in the H register along with the bit pointer code are applied to the Boolean processor 41 through the bus 55 during the execution of the MOV E,M machine instruction. The instruction decoder prom 122 therein identifies the XIC or XIO operation code and generates a logic high voltage on the XIC/XIO line 131.

The data, such as a status word in the I/O image table 8 which is selected by the controller instruction operand, is read out of the RAM 4 by the MOV E,M machine instruction and is applied to the Boolean processor 41 through the data bus 1. This data is applied to the bit selector 148 therein along with the bit pointer code on the bus 55. The bit pointer code selects one of the eight data bits on the data bus 1 and couples it to the logic unit where the logical operation called for by the XIC or XIO controller instruction is executed. A logic high voltage is also generated by the decode prom 122 and applied through the clear line 120 to reset the microprocessor program counter (PC) to zero. An XIC or XIO controller instruction is thus executed with two microprocessor machine instruction cycles which require a total time of approximately 12.5 microseconds.

The first three machine instructions in the above described macro-instruction decoder routine 175 are executed when the macro-instruction read from the RAM 4 by the POP H machine instruction is an OTE, OTD, OTL or OTU instruction. The POP H machine instruction loads the macro-instruction in the microprocessor H and L registers and when the next machine instruction (MOV E,M) is executed, the operation code and bit pointer are coupled through the bus 55 to the Boolean processor 41. The operand is coupled through the address bus 3 to select one of the first 256 lines in the RAM 4 and the selected data word is read out and coupled through the data bus 1 and data in buffers 50 to the E register in the microprocessor 40. The third machine instruction (MOV M,E) is then executed to load the contents of the E register back into the same line in the RAM 4. During this transfer, however, the controller instruction operation code and bit pointer code which are still stored in the microprocessor H register are again applied to the Boolean processor 41. Referring particularly to FIG. 3a, the operation code is recognized by the instruction decoder prom 122 which generates a logic high voltage on the OTX line 115. This logic high voltage and a logic high voltage generated on the WO line 29 by the timing and control circuit 45 enable the bit selector prom 99 and the bit pointer circuit 102. The bit pointer code is applied to the prom 99 and the decoder circuit 102 through the bus 55, and as a result, one of the eight tri-state gates 90-97 is driven to its high impedance state to effectively decouple a selected lead in the processor data bus 43 from the data bus 1 during the execution of the MOV M,E machine instruction. In addition, one of the tri-state gates 104-111 which connects to the same lead in the data bus 1 is enabled by the bit pointer circuit 102 and the logic state of the exclusive OR gate 112 is applied thereto. In net effect, therefore, during the third machine instruction (MOV M,E) the eight-bit data word is generated on the processor data bus 43 and coupled through the Boolean processor 41 back to its original location in the RAM 4. During this transfer, the output of the Boolean processor logic unit is imposed on the appropriate bit in that data word as it passes through the Boolean processor 41.

The instruction decoder prom 122 in the Boolean processor 41 is also responsive to the controller instruction operation code OTE, OTD, OTL or OTU to generate a logic high voltage at its output 134 which resets the microprocessor program counter (PC) through the clear line 129. After the third machine instruction (MOV M,E) has been executed, therefore, the system jumps back to the first machine instruction (POP H) to read out the next macro-instruction. An OTE, OTD, OTL or OTU type controller instruction thus requires three machine instruction cycles which result in an execution time of approximately 16.5 microseconds.

Referring particularly to FIG. 2, the remaining controller type instructions are executed by programs, or routines, which are stored in the ROM 42 and which are referred to collectively as the macro-instruction execution routines and I/O scan routine. It is the general purpose of the machine instructions which comprise the macro-instruction decoder program 175 to call up the proper macro-instruction execution routine each time a macro-instruction is read from the RAM 4 which is not executed as described above by the first three machine instructions.

The mapping table 176 is employed to accomplish this task. For each unique controller instruction operation code there exists a unique macro-instruction execution routine stored at a specific address in the ROM 42, and for each such macro-instruction execution routine there exists a location in the mapping table 176 which stores the starting address of that routine. The specific function of the macro-instruction decoder program 175, therefore, is to load the appropriate mapping table starting address into the microprocessor program counter (PC).

Referring specifically to the macro-instruction decoder program 175 listed above, after the first three machine instructions are executed the control instruction operation code is stored in the microprocessor H register and the operand address is stored in the L register. The fourth machine instruction (MVI D,ADRH) loads the constant 8K into the microprocessor D register. The next machine instruction (MOV E,L) transfers the control instruction operand address from the L register to the E register and the next two machine instructions (MOV L,H) (MOV B,L) transfers the operation code and bit pointer code from the H register to the L and B registers. The next machine instruction (MVI H,OOO) loads zeros into the H register and the eighth machine instruction (DAD H) shifts the contents of the H and L register pair left one bit location. At this point, the L register stores the least significant eight bits of the proper line in the mapping table 176. In other words, each macro-instruction operation code is shifted one place to the left to provide the memory location of the line in the mapping table 176 which stores the starting address of its associated macroinstruction execution routine.

Before reading out the contents of the appropriate line in the mapping table 176, however, the status of the Boolean processor 41 is loaded into the microprocessor A register by the tenth machine instruction (IN STATUS). This machine instruction causes a logic high voltage to be generated on the STATUS IN control line 71 and as shown in FIG. 3b, this enables the tristate gates 153-156 to couple the state of the logic unit flip-flops 137-140 to the data bus 1. Of particular importance is the state of the main decision flip-flop 140 which is applied to the most significant digit lead (DB7) in the data bus 1 and which represents the output, or decision, of the Boolean processor logic unit. Thus when the next machine instruction (ANA A) is executed to logically AND the contents of the A register with itself, the state of the most significant bit, or in other words, the decision of the Boolean processor 41, is stored in the sign bit of the microprocessor flag register for later use.

Finally, the twelfth and last machine instruction in the control instruction decoder program 175 is executed. The instruction (PCHL) places the contents of the H and L registers into the program counter, thus adjusting the program counter to point to a specific line in the mapping table 176 of the ROM 42. As indicated above, the contents of each line in the mapping table 176 is a jump instruction to the starting address of the appropriate macro-instruction execution routine.

The macro-instruction routines for the controller instruction operation codes, other than those executed directly by the first three machine instructions in the macro-instruction decoder program 175, are stored in the ROM 42. Each macro-instruction routine is terminated with a jump to zero instruction which resets the microprocessor program counter (PC) to zero. In other words, after a macro-instruction execution routine has been executed, the system jumps back to the POP H machine instruction in the macro-instruction decoder routine 175 to read out the next macro-instruction from the control program 10.

The macro-instruction routines for many of the instruction operation codes are described in detail in co-pending patent application Ser. No. 790,251 which was filed Apr. 25, 1977 and which is entitled "Programmable Controller with Integral MicroProcessor", now abandoned.

The last macro-instruction in the control program 10 is an "END" instruction which "maps" into an I/O scan routine. The I/O scan routine sequentially couples status words between each line of the I/O image table 8 and their corresponding I/O cards in the I/O interface racks 20-23. That is, an eight-bit status word is coupled to each I/O card containing output circuits and an eight-bit status word is coupled to the I/O image table 8 from each I/O card containing input circuits. In this manner the I/O image table 8 is updated with the current status of all sensing devices connected to the programmable controller and the calculated status of all operating devices connected to the programmable controller is outputted from the I/O image table 8. Near the completion of the I/O scan routine the memory address of the first controller instruction in the control program 10 is calculated and loaded into the stack pointer (SP). Consequently, when the system jumps back to the POP H instruction at the completion of the I/O scan routine, the first macro-instruction in the control program 10 will be executed next. In other words, after the I/O scan routine is executed the system immediately commences another scan, or sweep, through the control program 10.

Referring particularly to FIGS. 1 and 5, the I/O adapter circuits 24 on each I/O interface rack 20-23 couples the I/O cards on the rack with the I/O address bus 25 and the I/O data bus 32. The six leads in the I/O address bus 25 connect to the inputs of six Schmitt triggers 130 which serve as noise filters. Three outputs of the Schmitt triggers 130 connect through a bus 131 to a 2-bit rack number decoder 133, and three outputs connect through the bus 131 to a 3-bit I/O card eable decoder 134. The rack number decoder 133 generates a logic high voltage at its output 135 when it is enabled by the signal on one of the Schmitt trigger output lines 131 and the number (0-3) of the I/O interface rack of which the I/O adapter card 24 is a part is generated on the other two lines. The I/O card enable decoder 134 is a 4-line-to-10-line decoder which generates a logic high voltage on one of eight outputs 136 in response to the 3-bit binary code applied to its inputs. Each output line 136 connects to an I/O card in the same I/O interface rack and one of these eight cards is enabled each time an I/O address is generated on the bus 25 and the I/O interface rack has been enabled.

A set of four Schmitt triggers 136 receive the three control signals on the READ line 30, the WRITE line 31 and the STROBE line 18. The filtered READ and WRITE signals are generated on lines 138 and 139 respectively when the Schmitt triggers 137 are enabled by the rack number decoder 133. The READ line 138 connects to an enable terminal 40 on a set of eight data gates 141 and the WRITE line 139 connects to an enable terminal 142 on a set of eight data gates 143. The filtered STROBE signal is generated on line 144 when the Schmitt triggers 137 are enabled by the decoder 133. The line 144 connects to a clock terminal 145 on an eight-bit data latch 146 and to the enable terminal on a set of Schmitt triggers 150.

The eight leads in the I/O data bus 32 connect to the inputs of eight Schmitt triggers 147 and to the respective outputs of the data gates 141. The eight outputs of the Schmitt triggers 147 connect through a bus 148 to input terminals on the data gates 143 and the outputs of the eight data gates 143 connect to respective leads in an eight-bit I/O card data bus 151. The same leads in the bus 151 connect to respective inputs on the Schmitt triggers 150 which in turn connect to the data latch 146. The I/O card data bus 151 connects to each of the eight I/O cards in the I/O interface rack of which the I/O adapter circuit is a part.

Referring particularly to FIGS. 1 and 5, when data is outputted to an I/O interface rack 20-23 the address of that interface rack (0-3) and the address of the particular I/O card (0-7) in that interface rack appear on the I/O address bus 25. The data appears on the I/O data bus 32 and the write line 31 is at a logic high voltage. The rack number decoder 133 in the addressed I/O interface rack generates a logic high at its output 135 which enables the Schmitt triggers 137 to couple the logic signal on the write line 31 to the enable terminal 142 on the data gates 143. The addressed I/O card is enabled by the I/O card enable decoder 134 and the data on the bus 32 is coupled through the Schmitt triggers 147 and the data gates 143 to the enabled I/O card.

When data is inputted from an I/O interface rack 20-23, the address of that I/O interface rack and the address of the I/O card in that rack appear on the I/O address bus 25. A logic signal appears on the read line 30 and is gated through the Schmitt triggers 137 in the addressed I/O interface rack to the enable terminal 140 on the data gates 141. The data from the addressed I/O card appears on the I/O card data bus 151 and is clocked into the data latch 146 by the signal on the strobe line 18 which is gated through Schmitt trigger 137 to the control line 144. Eight bits of data is thus coupled through the data gates 141 onto the I/O data bus 32.

The input module of the present invention is indicated at 155 in FIG. 5. It includes two quad D-type flip-flops 156 which have then eight input terminals connected to an optical shaft encoder 157 through a cable 158. The flip-flops 156 serve as an 8-bit data latch and when a logic high is applied to an enable terminal 159, an eight-bit number on the cable 158 is stored in the flip-flops 156 and generated at its eight output terminals to the inputs of an exclusive OR array 160. The array 160 operates as a decoder which converts the "Gray Code" generated by the encoder 157 to its corresponding binary code. The eight output terminals on the decoder array 160 connect to the I/O card data bus 151.

When a logic high voltage appears on the card enable line 136 and the read line 138, a logic high voltage pulse is generated by an AND gate 161. The leading edge of this pulse enables the data latch 156 to read and store the shaft encoder output. During the remainder of the pulse the decoder array 160 is enabled to convert this number to binary form and generate it on the I/O card data bus 151.

In a typical installation the I/O scan routine is executed at least once every twenty milliseconds and thus the position of the shaft encoder 151 is read at least once every twenty milliseconds. As indicated above, the eight-bit binary number thus read into the controller is stored in the line of the I/O image table 8 of the RAM 4 which corresponds to the I/O card location of the input module 155 in the interface racks 20-23. It should be apparent that the particular type of encoder employed is not critical to the implementation of the present invention nor is the size of the digital number which it generates. For example, a second I/O card location may be employed to couple a second eight-bit byte of data from a sixteen-bit encoder.

The programmable limit switch instructions, GB and LT, are employed in the control program to provide the functions of a programmable limit switch. The machine instructions which are executed in response to the GB macro-instruction after the macro-instruction decoder program 175 has been executed are as follows:

| LABEL | MNEMONIC | OPERAND | COMMENT |
|---|---|---|---|
| GB | XCHG | | Transfer operand address from D and E registers to H and L registers. |
| | MOV | C,M | Get eight-bit binary number from I/O image table 8 and store in C register. |

-continued

| LABEL | MNEMONIC | OPERAND | COMMENT |
|---|---|---|---|
| | JMP | MAIN | Jump to POP H instruction in routine 175. |

When the LT macro-instruction is read from the memory 4 the macro-instruction decoder program 175 maps to the following set of machine instructions:

| LABEL | MNEMONTC | OPERAND | COMMENT |
|---|---|---|---|
| LT | MXHG | | Transfer operand address from D and E registers to H and L registers. |
| | MOV | A,C | Transfer present encoder position number from C to A register. |
| | CMP | M | Compare present encoder position number with lower limit. |
| | JC | OUTF | If present encoder position is less than lower limit, jump to OUT. |
| | INX | H | Increment H register to address upper limit number. |
| | MOV | A,M | Transfer 8-bit binary upper limit number from RAM 4 to A register. |
| | CMP | C | Compare present encoder position number with upper limit. |
| | JNC | MAIN | If present encoder position is equal to or less than the upper limit, jump to POP H instruction in decoder routine 175. |
| OUTF | MVI | A,84H | Load mask into H register from RAM 4. |
| | OUT | STATS | Output mask to logic unit of Boolean processor 41 to force a false decision. |
| | JMP | MAIN | Jump to POP H instruction in decoder routine 175. |

The above macro-instructions may be used with other programmable controller instructions to replace hardwired programmable limit switches. A control program for operating a motor starter connected to interface rack 21 (Rack No. 1), slot 0, terminal 5 in response to the status of a limit switch connected to interface rack 21, slot 1, terminal 3 and the shaft encoder 157 connected to interface rack 22 (Rack No. 2), slot 2, may be as follows:

| MNEMONIC | OPERAND | COMMENT |
|---|---|---|
| XIC | 11103 | If the limit switch is closed, and |
| GB | 1220 | |
| LT | 247,136,071 | if the shaft encoder position is between the upper limit of 247 (octal) and the lower limit of 136 (octal) |
| OTE | 01005 | then energize the motor starter. |

If the shaft encoder is not positioned between the two indicated limits then the logic unit is forced to a false decision by the LT instruction and the status bit in the I/O image table 8 which corresponds to the motor starter is set to a false state by the OTE instruction.

When the I/O scan routine is subsequently executed following the scan through the control program, this false status is coupled to the output circuit in interface rack 21 which drives the motor starter and it is deenergized. It should be apparent that numerous operating devices can thus be controlled as a function of the position of the shaft encoder 151 merely by the addition of suitable GB and LT instructions to the control program 10.

A number of variations can be made from the above described preferred embodiment without departing from the spirit of the invention. For example, a single macro-instruction could be employed to provide the functions of both the GB and the LT macro-instructions. Such a macro-instruction would include an operand address which identified the proper line in the I/O image table 8 as well as upper and lower limit numbers. Also, the use of immediate input instructions, such as that disclosed in copending patent application entitled "Programmable Controller With Programmable I/O Scan Rate", Ser. No. 839,628 filed Oct. 5, 1977, can be employed to input the present shaft encoder position number just prior to the GB and LT instructions.

We claim:

1. In a programmable controller having a processor which repeatedly executes instructions in a stored control program to examine the status of input devices connected thereto and couple their status to a logic unit and to operate output devices connected thereto in accordance with the condition of the logic unit, the improvement therein comprising:
   an input module coupled to said processor for interfacing said processor with a transducer that generates a multi-bit number;
   first storage means coupled to said processor and having locations for storing a preselected multi-bit upper limit number, and for storing a preselected multi-bit lower limit number;
   second storage means in said processor for storing a present position number;
   means coupled to said input module and said second storage means for inputting the multi-bit number generated by said transducer to said present position number storage location; and
   in which said processor includes means for comparing the arithmetic value of the present position number in said second storage means with the arithmetic values of the upper and lower limit numbers in said first storage means, said comparing means being operable to set said logic unit to a false condition if the present position nunber is less than the lower limit number or greater than the upper limit number.

2. The improvement as recited in claim 1 in which said comparing means operates in response to the execution of selected ones of the instructions in said control program.

3. The improvement as recited in claim 2 in which said means for inputting the multi-bit number forms part of said processor and operates in response to the execution of other selected ones of the instructions in said control program.

4. The improvement as recited in claim 2 in which the programmable controller includes a memory that stores an I/O image table and it includes I/O scan means for periodically coupling data from input devices to the I/O image table, for periodically coupling data to output devices from the I/O image table, and for periodically coupling the multi-bit number from said input module to a selected location in the I/O image table, and wherein said means for inputting the multi-bit number forms part of said processor and operates in response to the execution of other selected ones of the instructions in said control program to couple the contents of said selected location in the I/O image table to said present position number storage location.

5. The improvement as recited in claim 1 in which said processor includes a microprocessor and said logic unit is a separate Boolean processor.

6. The improvement as recited in claim 5 in which said storage means is comprised of selected registers in said microprocessor.

7. A programmable controller which comprises:
   a microprocessor connected to a random access memory which stores a control program, an I/O image table and macro-instruction execution routines;
   an interface rack coupled to the microprocessor and including an input module which connects to a position transducer to receive therefrom a multi-bit position number;
   a location in said random access memory for storing a present position number;
   a location in said random access memory for storing a preselected multi-bit upper limit number; and
   a location in said random access memory for storing a preselected multi-bit lower limit number:
   said microprocessor being operable in response to one of said macro-instruction execution routines associated with a selected one of said control program instructions to:
   (a) read the present position number from said random access memory;
   (b) read the upper limit number from said random access memory;
   (c) read the lower limit number from said random access memory;
   (d) compare the magnitudes of said three numbers read from the random access memory; and
   (e) generate a false condition logic signal if the present position number is less than said lower limit number or is greater than said upper limit number.

8. A programmable controller which comprises:
   a memory for storing a set of control instructions which comprise a control program;
   an interface rack for coupling the programmable controller to the sensing devices and operating devices on a machine, said interface rack also including an input module which connects to a position transducer on the machine to receive therefrom a multi-bit present position number;
   first means for storing a preselected multi-bit upper limit number;
   second means for storing a preselected multi-bit lower limit number; and
   a processor coupled to said memory, said interface rack, said first means, and said second means, said processor being operable in response to one type of control instruction read from the control program to input the status of sensing devices and generate true or false condition logic signals therefrom, said processor being operable in response to a second type of the control instruction read from the control program to output data to the operating devices on the machine, and said processor being operable in response to a third type of control instruction read from said control program to:

(a) read the present position number generated by said position transducer;
(b) read the upper limit number stored in said first means;
(c) read the lower limit number stored in said second means;
(d) compare the magnitudes of said three numbers; and
(e) generate a false condition logic signal if the present position number is less than said lower limit number or is greater than said upper limit number.

9. The programmable controller as recited in claim 8 in which said memory also stores an I/O image table and said programmable controller includes means coupled to said memory and said interface rack for periodically inputting data indicative of the status of sensing devices on the machine and storing said data in the I/O image table, said means for periodically inputting status data also periodically inputting said multi-bit position number from said position transducer and storing it in said I/O image table.

10. The programmable controller as recited in claim 8 in which said processor includes a microprocessor connected to a read-only memory, and in which said readonly memory stores a plurality of macro-instruction execution routines that direct the microprocessor to carry out the functions indicated by the first, second and third types of control instructions read from said control program.

* * * * *